(12) United States Patent
Gagliardo et al.

(10) Patent No.: US 10,249,893 B2
(45) Date of Patent: Apr. 2, 2019

(54) FUEL CELL ARCHITECTURES, MONITORING SYSTEMS, AND CONTROL LOGIC FOR CHARACTERIZING FLUID FLOW IN FUEL CELL STACKS

(71) Applicant: GM GLOBAL TECHNOLOGY OPERATIONS LLC, Detroit, MI (US)

(72) Inventors: Jeffrey J. Gagliardo, Clarkston, MI (US); Chad Dubois, Oxford, MI (US); Xiaofeng Wang, Troy, MI (US); Manish Sinha, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 45 days.

(21) Appl. No.: 15/497,983

(22) Filed: Apr. 26, 2017

(65) Prior Publication Data

US 2018/0316029 A1 Nov. 1, 2018

(51) Int. Cl.
*B60L 9/00* (2006.01)
*H01M 8/04537* (2016.01)
*H01M 8/0438* (2016.01)
*H01M 8/04992* (2016.01)
*B60L 11/18* (2006.01)
*H01M 8/1018* (2016.01)

(52) U.S. Cl.
CPC ..... *H01M 8/04559* (2013.01); *B60L 11/1883* (2013.01); *B60L 11/1888* (2013.01); *H01M 8/04402* (2013.01); *H01M 8/04992* (2013.01); *B60L 2240/527* (2013.01); *H01M 2008/1095* (2013.01); *H01M 2250/20* (2013.01); *H01M 2250/402* (2013.01)

(58) Field of Classification Search
CPC ........ H01M 8/04559; H01M 8/04402; H01M 8/04992; H01M 2008/1095; H01M 2250/20; H01M 2250/402; B60L 11/1883; B60L 11/1888; B60L 2240/527
USPC .............. 701/22; 429/23, 410, 430; 324/439
See application file for complete search history.

(56) References Cited

U.S. PATENT DOCUMENTS

| | | | |
|---|---|---|---|
| 6,576,356 B1 | 6/2003 | Hallum |
| 6,602,624 B1 | 8/2003 | Doan et al. |
| 6,841,292 B2 | 1/2005 | Nelson et al. |
| 6,866,955 B2 | 3/2005 | Lee et al. |
| 7,160,341 B2 | 1/2007 | Sinha et al. |
| 7,264,895 B2 | 9/2007 | White |

(Continued)

*Primary Examiner* — Shardul D Patel
(74) *Attorney, Agent, or Firm* — Quinn IP Law

(57) ABSTRACT

Disclosed are fuel cell architectures, fuel cell stack monitoring systems, and control logic for detecting fluid property changes in a fuel cell stack. A method is disclosed for detecting a flow property change of a fluid in a fuel cell system. This method includes determining, e.g., through system analysis or accessing a look-up table, a correlation between voltage change of the fuel cell system and flow property of the fluid, and determining, from the voltage-property correlation, a calibrated voltage drop corresponding to the property change of the fluid. The method monitors system voltage (e.g., moving average voltage of the fuel cell stack operating at steady state), and detecting a voltage magnitude change in the system voltage, e.g., when an anode exhaust valve is opened. Responsive to the voltage magnitude change being greater than the calibrated voltage drop, a signal is generated indicating detection of the flow property change.

20 Claims, 2 Drawing Sheets

(56) References Cited

U.S. PATENT DOCUMENTS

| | | |
|---|---|---|
| 7,759,010 B2 | 7/2010 | Hoch |
| 7,955,743 B2 | 6/2011 | Ganapathy et al. |
| 8,043,759 B2 | 10/2011 | Zhang et al. |
| 8,206,872 B2 | 6/2012 | Brenner et al. |
| 8,313,871 B2 | 11/2012 | Wexel et al. |
| 8,603,654 B2 | 12/2013 | Cartwright et al. |
| 8,617,770 B2 | 12/2013 | Yan et al. |
| 8,828,613 B2 | 9/2014 | Zhang et al. |
| 9,099,703 B2 | 8/2015 | Rapaport et al. |
| 9,337,494 B2 | 5/2016 | Zhang et al. |
| 2003/0022033 A1* | 1/2003 | Stimming ......... H01M 8/04223 429/412 |
| 2007/0141405 A1* | 6/2007 | Lai .................... H01M 4/8605 429/483 |
| 2007/0231637 A1* | 10/2007 | Shibata ............. H01M 8/04223 429/429 |
| 2008/0020262 A1 | 1/2008 | Zhang et al. |
| 2008/0070076 A1* | 3/2008 | Makita ............. H01M 8/04186 429/444 |
| 2008/0107941 A1* | 5/2008 | Skidmore ......... H01M 8/04552 429/432 |
| 2010/0261081 A1* | 10/2010 | Rock .................. H01M 8/0202 429/430 |
| 2011/0039190 A1 | 2/2011 | Owejan et al. |
| 2011/0195324 A1* | 8/2011 | Zhang ................ H01M 8/0258 429/413 |
| 2011/0207012 A1 | 8/2011 | Frost et al. |
| 2014/0255810 A1* | 9/2014 | Lenz ................ H01M 8/04619 429/430 |
| 2014/0335432 A1 | 11/2014 | Sinha et al. |
| 2015/0153418 A1* | 6/2015 | Prenninger ........ G01R 31/3662 702/63 |
| 2015/0357650 A1* | 12/2015 | Lakshmanan ....... H01M 4/0428 427/113 |
| 2016/0380281 A1* | 12/2016 | Im ...................... H01M 8/0488 429/432 |
| 2017/0096167 A1* | 4/2017 | Yoon .......................... B60R 1/00 |
| 2017/0125830 A1* | 5/2017 | Jeon ................. H01M 8/04225 |

* cited by examiner

FUEL CELL ARCHITECTURES, MONITORING SYSTEMS, AND CONTROL LOGIC FOR CHARACTERIZING FLUID FLOW IN FUEL CELL STACKS

INTRODUCTION

The present disclosure relates generally to fuel cell systems for converting gaseous hydrogen-based fuels into electricity. More specifically, aspects of this disclosure relate to monitoring systems and related control algorithms for characterizing fluid flow from the anode volume to the cathode volume of a fuel cell stack.

Current production motor vehicles, such as the modern-day automobile, are originally equipped with a powertrain that operates to propel the vehicle and power the onboard vehicle electronics. The powertrain, which is inclusive of, and oftentimes misclassified as, a vehicle drivetrain, is generally comprised of a prime mover that delivers driving power to the vehicle's final drive system (e.g., differential, axle, and road wheels) through a multi-speed power transmission. Automobiles have generally been powered by a reciprocating-piston type internal combustion engine (ICE) because of its ready availability and relatively inexpensive cost, light weight, and overall efficiency. Such engines include two and four-stroke compression-ignited (CI) diesel engines, four-stroke spark-ignited (SI) gasoline engines, six-stroke architectures, and rotary engines, as some non-limiting examples. Hybrid and electric vehicles, on the other hand, utilize alternative power sources, such as an electric motor-generator, to propel the vehicle and minimize reliance on an engine for power and, thus, increase overall fuel economy.

Hybrid-electric and full-electric vehicle powertrains take on various architectures, some of which utilize a fuel cell system to supply power for one or more electric traction motors. A fuel cell is an electrochemical device generally composed of an anode that receives hydrogen ($H_2$), a cathode that receives oxygen ($O_2$), and an electrolyte interposed between the anode and cathode. An electrochemical reaction is induced to oxidize hydrogen molecules at the anode to generate free protons (H+), which are then passed through the electrolyte for reduction with an oxidizing agent, such as oxygen, at the cathode. In particular, hydrogen gas is catalytically split in an oxidation half-cell reaction in the anode catalyst layer to generate free hydrogen protons and electrons. These hydrogen protons pass through the electrolyte to the cathode, where the hydrogen protons react with oxygen and electrons in the cathode to generate water. Electrons from the anode, however, cannot pass through the electrolyte and, thus, are redirected through a load, such as a motor or battery, before being sent to the cathode.

Fuel cell designs commonly employed in automotive applications utilize a solid polymer electrolyte membrane (PEM)—also called "proton exchange membranes" (PEM)—to provide ion transport between the anode and cathode. Proton exchange membrane fuel cells (PEMFC) generally employ a solid polymer electrolyte (SPE) proton-conducting membrane, such as a perfluorosulfonic acid membrane, to separate product gases and provide electrical insulation of electrodes, in addition to conduction of protons. The anode and cathode typically include finely dispersed catalytic particles, such as platinum (Pt), supported on carbon particles and mixed with an ionomer. The catalytic mixture is deposited on the sides of the membrane to form the anode and cathode catalytic layers. The combination of the anode catalytic layer, cathode catalytic layer, and electrolyte membrane define a membrane electrode assembly (MEA) in which the anode catalyst and cathode catalyst are supported on opposite faces of the ion conductive solid polymer membrane.

To generate the requisite electricity for powering a motor vehicle, numerous fuel cells are typically combined, in series or in parallel, into a fuel cell stack to achieve a higher output voltage and allow for stronger current draw. For example, a typical fuel cell stack for an automobile may have two hundred or more stacked fuel cells. These fuel cell stacks receive reactant gas as a cathode input, typically as a flow of ambient air or concentrated gaseous oxygen forced through the stack by a compressor. During normal operation, a quantifiable mass of the oxygen is not consumed by the stack; some of the remnant oxygen is output as cathode exhaust gas that may include water as a stack byproduct. The fuel cell stack also receives hydrogen or hydrogen-rich reactant gas as an anode input that flows into the anode side of the stack. The distribution of hydrogen within the anode flow channels is typically held substantially constant for proper fuel cell stack operation. In some operational modes, supplementary hydrogen is fed into the fuel cell stack so that the anode gas is evenly distributed to achieve a stack output load. With this additional hydrogen input, however, the amount of hydrogen in the anode's exhaust is likely to increase, which can lead to reduced system efficiency.

Stack voltage is typically insensitive to hydrogen concentration due to very fast hydrogen-oxidation reaction kinetics and low hydrogen mass transfer. Consequently, barring a hydrogen starvation event, the stack voltage typically does not show significant variation as a result of changes in hydrogen concentration. In the same vein, AC impedance response typically shows little or no sensitivity to hydrogen concentration in the anode. Due to this perceived insensitivity, stack voltage is historically not used to infer hydrogen or oxygen concentration in the anode and cathode compartments of a fuel cell. Rather, known methods compare actual gas flow rates with modeled valve flow rates to infer gas concentrations, or employ dedicated electronic sensors to detect such concentrations. Flow rate comparisons, however, have limited accuracy due to system leakage and operating condition fluctuations (e.g., temperature, current density, relative humidity, pressure, etc.). As per the dedicated sensing electronics, nitrogen and hydrogen sensors are very expensive components and relatively unreliable devices for estimating fuel cell states, such as determining the concentration of hydrogen or oxygen in sections of a fuel cell system over the operational life of the system.

SUMMARY

Disclosed herein are vehicle fuel cell architectures, fuel cell stack monitoring systems, and related control logic for estimating fuel cell state, such as detecting bulk fluid delivered to the cathode from the anode changing from liquid-to-gas and solid-to-gas in a fuel cell stack. By way of example, and not limitation, there is presented a novel procedure for characterizing fluid flow from the anode volume to the cathode volume using fuel cell stack voltage response for improved anode valve flow characterization to help optimize stack efficiency and mitigate unwanted stack emissions. In this example, when an anode valve opens, liquid water may first flow through the valve orifice, followed by gas flow through the orifice. Bulk fluid property changes at the orifice, such as liquid to gas, may be detected by monitoring stack voltage and identifying a voltage dip event of a calibrated magnitude. Such an event occurs when additional hydrogen is delivered to the cathode side of the stack, which will commensurately reduce oxygen concentration in the electrode by diluting $O_2$ and consuming $O_2$ at the catalyst surface through combustion. This reduction in $O_2$ concentration at the cathode electrode will reduce the voltage of the fuel cell stack. A calibrated or modeled magnitude of the voltage drop is related to the anode valve flow to characterize the fluid state change (liquid-to-gas, gas-to-liquid, gas-to-solid, solid-to-gas bulk property change) at the valve.

Attendant benefits for at least some of the disclosed concepts include improved system reliability, increased stack efficiency, decreased stack emissions, and reduced system costs. For instance, rather than require a dedicated sensing device or use estimated flow rates as the basis for phase detection, disclosed detection methods monitor system voltage changes to detect liquid-gas or solid-gas bulk fluid transitions to improve reliability and efficiency. This approach increases system reliability by mitigating the lack of precision associated with flow rate comparisons, and reduces system costs by eliminating dedicated sensing devices. Improved reliability is achieved by providing fluid characterization feedback to the system even if a system pressure sensor fails. During operating conditions when the vehicle is driving over rough terrain, a "noisy" valve flow signal may be generated due to sloshing liquid; disclosed methods eliminate this signal noise thus providing a clearer signal. Other attendant benefits may include minimizing impact of environmental variations and replaceable component failure by eliminating dependence on the physical sensors.

Aspects of the present disclosure are directed to control algorithms for characterizing fluid flow in a fuel cell stack, and regulating system operation in response to, for example, a liquid fluid replaced with a gaseous fluid. Disclosed, for example, is a method for characterizing fluid flow from the anode volume to the cathode volume to determine the transition of one fluid state with another (e.g., liquid-to-gas and gas-to-liquid). A method for detecting a bulk flow property change of a fluid in a fuel cell system includes, in any order and in any combination with any of the disclosed features: determining, e.g., through system analysis, system modelling, and/or accessing a look-up table, a voltage-property correlation between voltage change of the fuel cell system and flow property change of the fluid; determining, from this voltage-property correlation, a calibrated voltage drop corresponding to the bulk fluid property transition of the fluid; monitoring a system voltage of the fuel cell system (e.g., calculating a moving average voltage of the fuel cell stack operating at steady state); detecting a voltage magnitude change in the system voltage, e.g., when an anode exhaust valve is opened; and, responsive to a determination that the voltage magnitude change is greater than the modelled or calibrated voltage drop, outputting a signal indicating detection of the flow fluid property change. This signal may include a command signal to close the anode exhaust valve and/or a signal with an indicator that a liquid water separator of the fuel cell system is empty or near empty.

Other aspects of the present disclosure are directed to motor vehicles with proton exchange membrane fuel cells (PEMFC) regulated in accordance with any of the disclosed property-detection procedures. A "motor vehicle," as used herein, may include any relevant vehicle platform, such as passenger vehicles (fuel cell hybrid, fuel cell electric, fully or partially autonomous, etc.), commercial vehicles, industrial vehicles, tracked vehicles, off-road and all-terrain vehicles (ATV), farm equipment, boats, airplanes, etc. Fuel cell assemblies regulated in accordance with disclosed property-change-detection procedures may be employed in other applications, such as portable fuel cell devices, e.g., for powering residential and commercial devices, and stationary fuel cell power plants, e.g., designed to provide a clean, reliable source of power to airports, hospitals, schools, banks, and homes. A fuel-cell powered motor vehicle is disclosed that includes a vehicle body, multiple road wheels, and a traction motor attached to the vehicle body for driving one or more of the road wheels. An in-vehicle fuel cell system, which powers the traction motor, includes a fuel cell stack with a proton exchange membrane interposed between a cathode and an anode, and an anode exhaust valve that regulates the transmission of exhaust gas from the anode to a liquid water separator.

The fuel-cell powered motor vehicle also includes a vehicle controller, such as a programmable powertrain electronic control unit (ECU), for monitoring and controlling the fuel cell system. The vehicle controller is programmed to identify a voltage-property correlation between voltage change of the fuel cell system and flow property changes of a hydrogen-based fluid in the fuel cell system, and determine, from this voltage-property correlation, a calibrated or threshold voltage drop corresponding to a bulk fluid property change of the hydrogen-based fluid. The vehicle controller monitors fuel cell system voltage, e.g., while the anode exhaust valve is in both closed and open states, to detect a voltage magnitude change in the system voltage when the anode exhaust valve transitions from the closed state to the open state. In response to the voltage magnitude change being greater than the calibrated (e.g., modeled) voltage drop, the controller outputs a signal indicating detection of the flow phase change and a command signal to close the anode exhaust valve. Optionally, this controller signal may also include a command to temporarily turn off the fuel cell system.

Other aspects of the present disclosure are directed to non-transitory, computer readable media storing instructions executable by at least one of one or more processors of one or more in-vehicle electronic control units. These instructions, when executed, cause the ECU(s) to perform various operations, which may include, in any order and in any combination with any features presented in this disclosure: determining a correlation between voltage change of a fuel cell system and properties of a fluid in the fuel cell stack; determining, from this voltage-property correlation, a modelled or calibrated voltage drop corresponding to a change of the fluid; monitoring system voltage of the fuel cell system; detecting a voltage magnitude change in the stack voltage; and, responsive to a determination that the voltage magnitude change is greater than the calibrated voltage drop, outputting a signal indicating detection of the flow property change.

The above summary is not intended to represent every embodiment or every aspect of the present disclosure. Rather, the foregoing summary merely provides an exemplification of some of the novel concepts and features set forth herein. The above features and advantages, and other features and advantages of the present disclosure, will be readily apparent from the following detailed description of representative embodiments and representative modes for carrying out the present disclosure when taken in connection with the accompanying drawings and the appended claims. Moreover, this disclosure expressly includes any and all

Figure 1:
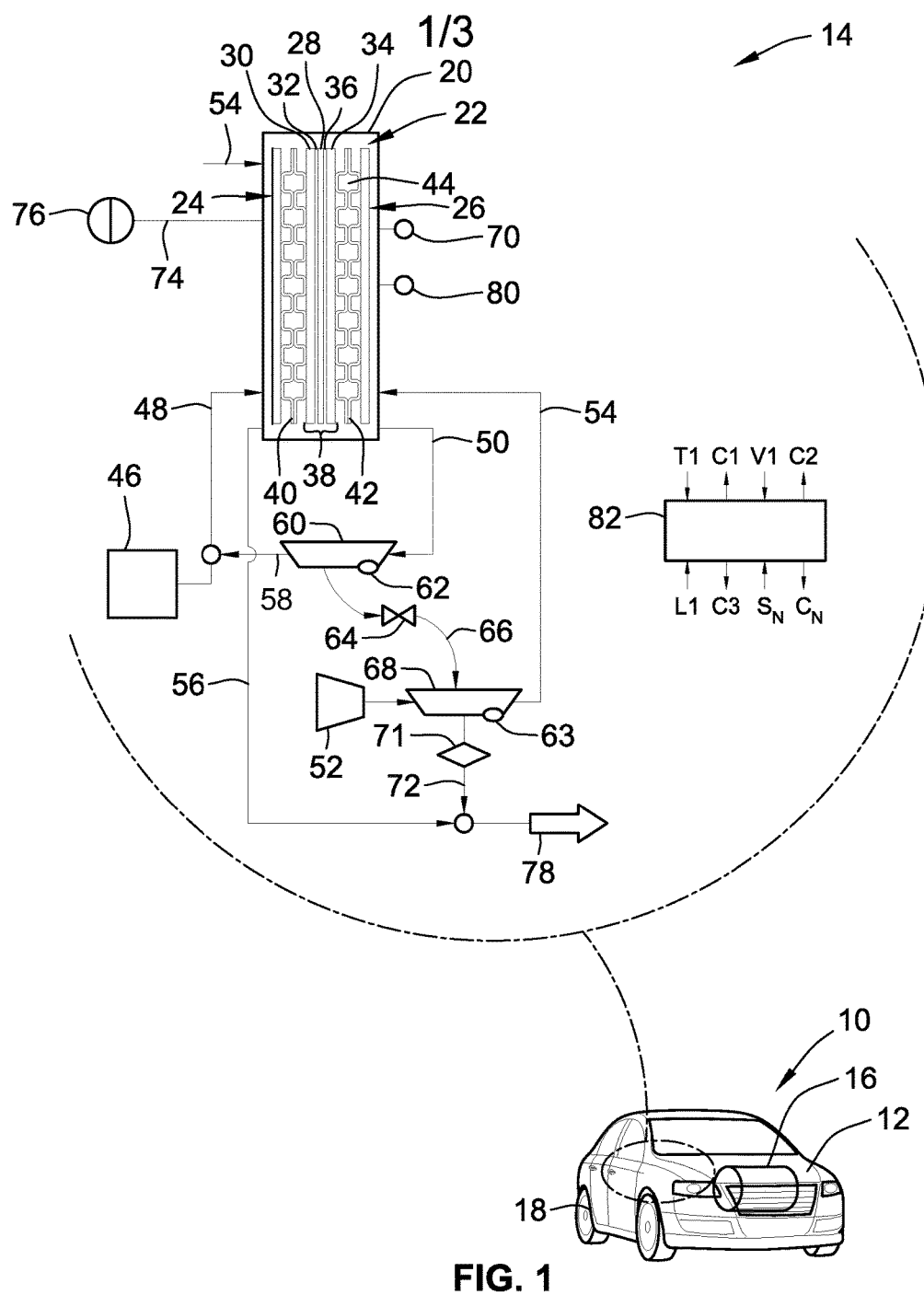
FIG. 1 is a perspective view illustration of a representative motor vehicle with an inset schematic diagram of a representative fuel cell system with fluid flow phase-detection capabilities in accordance with aspects of the present disclosure.

The present disclosure is susceptible to various modifications and alternative forms, and some representative embodiments have been shown by way of example in the drawings and will be described in detail herein. It should be understood, however, that the novel aspects of this disclosure are not limited to the precise forms illustrated in the appended drawings. Rather, the disclosure is to cover all modifications, equivalents, combinations, subcombinations, permutations, groupings, and alternatives falling within the scope and spirit of the disclosure as defined by the appended claims.

DETAILED DESCRIPTION

This disclosure is susceptible of embodiment in many different forms. There are shown in the drawings and will herein be described in detail representative embodiments of the disclosure with the understanding that these representative embodiments are to be considered an exemplification of the principles of the disclosure and are not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference or otherwise. For purposes of the present detailed description, unless specifically disclaimed: the singular includes the plural and vice versa; the words "and" and "or" shall be both conjunctive and disjunctive; the word "all" means "any and all"; the word "any" means "any and all"; and the words "including" and "comprising" and "having" mean "including without limitation." Moreover, words of approximation, such as "about," "almost," "substantially," "approximately," and the like, may be used herein in the sense of "at, near, or nearly at," or "within 3-5% of," or "within acceptable manufacturing tolerances," or any logical combination thereof, for example.

Referring now to the drawings, wherein like reference numbers refer to like features throughout the several views, there is shown in FIG. 1 an illustration of a representative automobile, which is designated generally at 10 and portrayed herein for purposes of discussion as a four-door sedan-style passenger vehicle. Packaged within the vehicle body 12 of automobile 10 is a representative fuel cell system, designated generally at 14, for powering one or more traction motors 16 operable for driving the vehicle's road wheels 18. The illustrated automobile 10—also referred to herein as "motor vehicle" or "vehicle" for short—is merely an exemplary application with which many aspects and features of this disclosure may be practiced. In the same vein, implementation of the present concepts into a PEMFC-type fuel cell system 14 should also be appreciated as an exemplary application of the novel concepts disclosed herein. As such, it will be understood that many aspects and features of the present disclosure may be applied to other fuel cell system architectures, utilized for other automotive and non-automotive applications, and implemented by any logically relevant type of motor vehicle. Lastly, the drawings presented herein are not necessarily to scale and are provided purely for instructional purposes. Thus, the specific and relative dimensions shown in the drawings are not to be construed as limiting.

Proton exchange membrane fuel cell system 14 of FIG. 1 is equipped with one or more fuel cell stacks 20, each of which is composed of multiple fuel cells 22 of the PEM type that are mounted, e.g., in series, to one another. In the illustrated architecture, each fuel cell 22 is, for example, a multi-layer construction with an anode side 24 and a cathode side 26 that are separated by a proton-conductive perfluorosulfonic acid membrane 28. An anode diffusion media layer 30 is provided on the anode side 24 of the PEMFC 22, with an anode catalyst layer 32 interposed between and operatively connecting the membrane 28 and corresponding diffusion media layer 30. Likewise, a cathode diffusion media layer 34 is provided on the cathode side 26 of the PEMFC 22, with a cathode catalyst layer 36 interposed between and operatively connecting the membrane 28 and corresponding diffusion media layer 34. These two catalyst layers 32 and 36 cooperate with the membrane 28 to define, in whole or in part, an MEA 38. The diffusion media layers 30 and 34 are porous constructions that provide for fluid inlet transport to and fluid exhaust transport from the MEA 38. An anode flow field plate (or "bipolar plate") 40 is provided on the anode side 24 in abutting relation to the anode diffusion media layer 30. In the same vein, a cathode flow field plate (or "bipolar plate") 42 is provided on the cathode side 26 in abutting relation to the cathode diffusion media layer 34. Coolant flow channels 44 traverse each of the bipolar plates 40 and 42 to allow cooling fluid to flow through the fuel cell 22. Respective fluid inlet ports and manifolds direct hydrogen fuel and oxidant to passages in the anode and cathode flow field plates.

FIG. 1 also presents a simplified block diagram of a fuel cell system architecture that allows for estimating fuel cell state, such as detecting liquid-to-gas, gas-to-liquid, solid-to-gas and gas-to-solid phase changes of a fluid flow at discrete locations in the fuel cell stack. Select components of the fuel cell system have been shown by way of example in the drawings and will be described in detail herein. Nevertheless, the fuel cell system can include numerous additional and alternative features, and other well-known peripheral components, without departing from the intended scope of this disclosure. By way of example, and not limitation, hydrogen ($H_2$) inlet flow—be it gaseous, concentrated, entrained or otherwise—is transmitted from a hydrogen source 46 to the anode side 24 of the fuel cell stack 20 via a (first) fluid intake line or hose 48. Anode exhaust exits the stack 20 via a (first) fluid exhaust conduit or manifold 50. A compressor or pump 52 provides a cathode inlet flow, e.g., of ambient air and/or concentrated gaseous oxygen ($O_2$), via a (second) fluid intake line or hose 54 to the cathode side 26 of the stack 20. Cathode exhaust is output from the stack 20 via a (second) fluid exhaust conduit or manifold 56. The fuel cell system 14 also employs anode recirculation where an anode recirculation gas is fed from anode exhaust manifold 50, through an anode recirculation line 58 and fluid intake line 48 for recirculation back to the anode side 24 input so as to conserve hydrogen gas in the stack 20. Flow control valves, flow restrictions, filters, and other known devices for regulating fluid flow can be implemented by the system 14 of FIG. 1.

Water is a byproduct of operating the fuel cell system 14; in order to remove liquid water from the anode exhaust gas stream in exhaust manifold 50 so it is not sent back to the anode in the recirculated anode gas, a water separation device (or "separator") 60 is interposed between the exhaust manifold 50 and anode recirculation line 58. The water separation device 60, which may be active or passive, centrifugal or Venturi, screen or mesh, etc., includes a reservoir or tank that holds water collected by the separator 60. A bleed/drain valve 64, which is fluidly coupled to a bottom portion of the reservoir, operates to drain the reservoir and, optionally, bleed nitrogen from the recirculated anode gas. In this embodiment, the bled gas and water is sent on drain line 66 to a second water separation device (or "separator") 68 that removes water from the cathode inlet flow and the drain flow before being sent through fluid intake line 54 to the cathode side 26 of the stack 20. A flow control valve or orifice 71 regulates the flow and/or pressure of fluid exiting the second separator 68. Water bled from this separator 68 is sent on line 72 to be mixed with the cathode exhaust gas in the exhaust manifold 56, e.g., to ensure that hydrogen within the bled exhaust gas is diluted to be well below combustible levels before exiting through fuel cell system (FCS) exhaust 78.

The fuel cell system 14 is also equipped with various sensing devices that assist with monitoring stack operation, detecting fluid phase change, and regulating fuel cell exhaust and recirculation. Some non-limiting examples include first and second water level indicators 62 and 63, respectively, that each generates sensor signals indicative of the water level in the reservoir of a respective separator 60, 68. From these signals, the system 14 may determine when to drain each separator reservoir. A voltage/current sensor 70 is operable to measure, monitor or otherwise detect fuel cell system voltage and/or current output from the fuel cells 22 in the stack 20 during operation thereof. In this regard, an electrical connector or cable 74 connects the fuel cell stack 20 to the vehicle's electric power supply 76, which may be in the nature of a traction battery pack. As another example, a temperature sensor 80 measures, monitors or otherwise detects a temperature value of the fuel cell stack 20.

Programmable electronic control unit (ECU) 82 helps to control operation of the fuel cell system 14. As an example, ECU 82 receives one or more temperature signals T1 from the temperature sensor 80 that indicates the temperature of the fuel cell stack 20; ECU 82 may be programmed to responsively issue one or more command signals C1 to modulate operation of the stack 20 and or a fuel cell stack temperature-control subsystem (not shown). ECU 82 of FIG. 1 also receives one or more voltage signals V1 from the voltage sensor 70; ECU 82 may be programmed to responsively issue one or more command signals C2 to modulate operation of the hydrogen source 46 and/or compressor/pump 52 to thereby regulate the electrical output of the stack 20. ECU 82 of FIG. 1 is also shown receiving one or more fluid level signals L1 from the water level indicators 62, 63; ECU 82 may be programmed to responsively issue one or more command signals C2 to modulate operation of the bleed/drain valve 64 and/or flow control valve/orifice 71. Additional sensor signals $S_N$ may be received by, and additional control commands $C_N$ may be issued from the ECU 82, e.g., to control any other subsystem or component illustrated and/or described herein. An exemplary algorithm executable by the ECU 82 for monitoring fuel cell stack state is discussed below in more detail. In FIG. 1, the arrows originating from or extending to the ECU 82 are emblematic of electronic signals or other communication exchanges by which data and/or control commands are transmitted from one component to the other.

To help optimize fuel cell efficiency and mitigate hydrogen gas emissions, the fuel cell system is equipped with improved stack monitoring capabilities that utilize stack voltage response to characterize fluid flow from the anode volume to the cathode volume. By correlating fuel cell voltage drop and flow media phase changes due to an anode valve opening, for example, bulk fluid property changes for the fuel cell system can be detected. When an anode valve opens, it is normal that liquid water flows through the valve orifice first, followed by gas flow through the orifice. If additional hydrogen is delivered to the cathode, the oxygen concentration at the electrode is reduced by diluting $O_2$ and consuming $O_2$ at the catalyst surface through combustion. This reduction in oxygen concentration at the cathode electrode will reduce the voltage of the fuel cell stack. By relating the magnitude of this voltage drop to the anode valve flow, fluid flow phase changes—liquid-to-gas, gas-to-liquid, gas-to-solid, solid-to-gas—can be detected. In so doing, disclosed phase change detection procedures can increase fuel cell operational life expectancy and reduce system cost and warranty issues while concomitantly minimizing cathode exhaust hydrogen concentration.

In at least some of the disclosed embodiments, phase detection based on voltage dip calculates fuel cell stack voltage differences when the anode valve is open and when the anode valve is closed. By correlating voltage change and flow phase change (e.g., from liquid to gas), phase detection can be determined. One novel part of this methodology is to use an operating fuel cell voltage response change, instead of flow rate change, to determine the moment of flow phase change. Another novel part of this methodology is a reduced dependence on physical sensors, which minimizes the impact of environmental variations and replaceable component failure. Unlike some conventional approaches where three sensors are required to fulfill the phase estimation procedure—a pressure sensor at the anode inlet, a pressure sensor at the cathode inlet, and a temperature sensor of coolant inlet—a single voltage sensor is employed to complete the phase estimation in disclosed methods.

Figure 2:
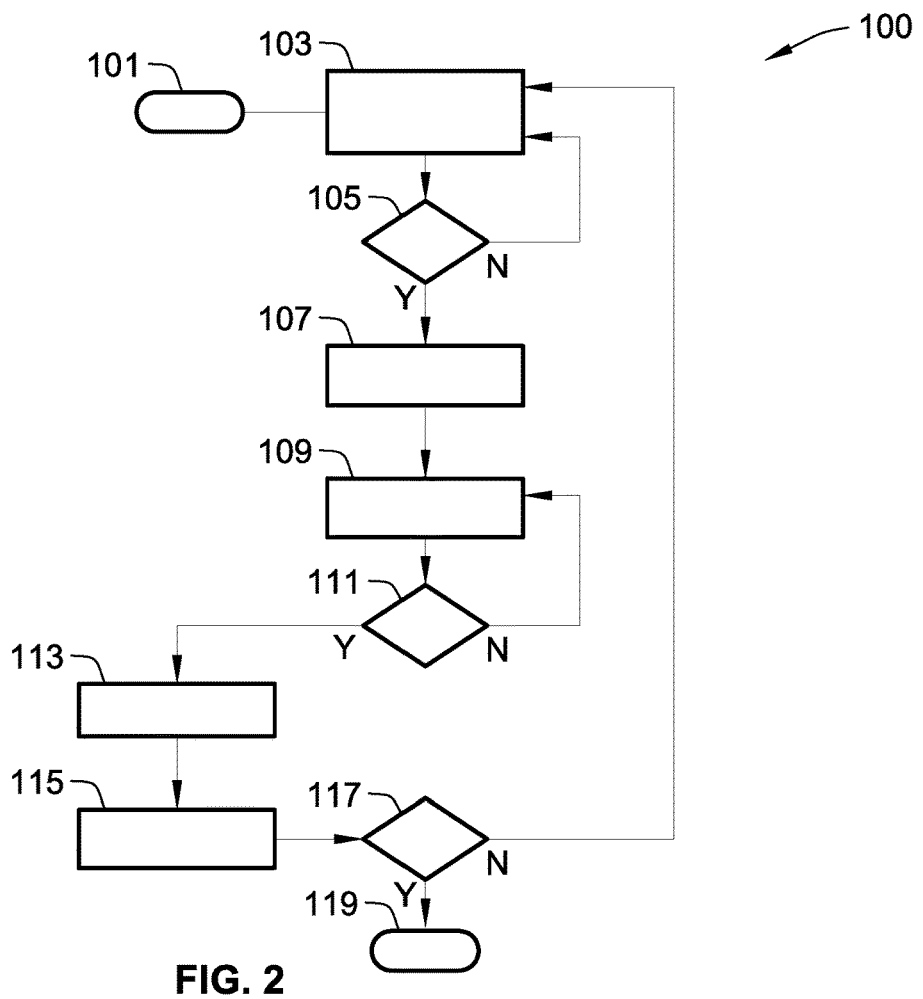
FIG. 2 is a flowchart for a fuel cell phase detection algorithm that may correspond to memory-stored instructions executed by onboard control-logic circuitry, one or more programmable electronic control units, or other computer-based device of a motor vehicle in accord with aspects of the disclosed concepts.

With reference now to the flow chart of FIG. 2, an improved method or control strategy for operating a fuel cell system, such as fuel cell system 14 of FIG. 1, for bulk flow property characterization of fluids flowing to or from one or more fuel cells in a stack, such as fuel cell 22 of stack 20 in FIG. 1, for example, is generally described at 100 in accordance with aspects of the present disclosure. Some or all of the operations illustrated in FIG. 2 and described in further detail below can be representative of an algorithm that corresponds to processor-executable instructions that can be stored, for example, in main or auxiliary or remote memory, and executed, for example, by an ECU, a central processing unit (CPU), an on-board or remote control logic circuit, or other device, to perform any or all of the above and/or below described functions associated with the disclosed concepts.

Method 100 of FIG. 2 starts at block 101 with monitoring a fuel cell system valve, such as anode bleed/drain valve 64 or flow control valve/orifice 71 of FIG. 1, to detect whether the valve is in an open state (liquid or gas allowed to pass through the valve) or in a closed state (liquid or gas prevented from passing through the valve). Prior to, contemporaneous with, or after determining the operating state of the valve, the ECU 82 will determine a correlation between voltage change of the fuel cell system and fluid property changes (e.g., flow phase) of a fluid passing through the valve (also referred to herein as "voltage-property correlation"). Ascertaining an approximate voltage-property correlation may be accomplished by way of fuel cell system analysis, by accessing a system-calibrated look-up table, or any other logically relevant means. By way of non-limiting example, a voltage-property correlation may be determined by correlating stack voltage response of the fuel cell system and flow phase change of the fluid when the anode valve is in a closed state and then in an open state. In an even more specific example, the voltage-property correlation includes correlating voltage change and flow phase change: (1) during steady state operation of the fuel cell, (2) while the anode valve is open, and (3) with a pressure bias on the anode side. A fuel cell system can be said to be operating under "steady state" conditions when the effects of transients are no longer significant (e.g., when fuel cell stack current density does not change dramatically). During a load transient, for example, the power drawn from the fuel cell stack is significantly increased or decreased in response to input requests from a user, and the operating conditions of the fuel cell stack and the load (or current) are changed accordingly. To mitigate signal response to momentary transients, an analogue-signal-processing hysteresis block may be added to the system to filter the voltage signal.

From the voltage-property correlation, the system can identify a calibrated or modelled "threshold" voltage drop (Vdip) value that corresponds to a flow property change of the fluid. For at least some applications, the calibrated/modelled voltage drop is between approximately 0.005 and 0.015 volts (V) at a current density (CD) of between approximately 0.1 and 1.0 amperes per square centimeter ($A/cm^2$) and an anode-to-cathode pressure bias of between approximately 20 and 100 KiloPascals (kPa). According to one specific example, the Vdip value is approximately 5 millivolts (mV) at a current density of approximately 1.0 $A/cm^2$ and a pressure bias of approximately 20 kPa on the anode side. At a current density of approximately 0.4 $A/cm^2$ and a pressure bias of approximately 40 kPa on the anode, the Vdip value is approximately 10 mV. In another example, the Vdip value is approximately 15 mV at a current density of approximately 0.1 $A/cm^2$ and a pressure bias of approximately 40 kPa on the anode side. At 100 kPa, the Vdip value may increase to approximately 25 mV (dry) to 35 mV (wet) with an approximately 2 second valve bleed. For low pressure differentials between the anode and cathode, it may be desirable for at least some applications to utilize a low current density region (<=1.0 A/cm2); in a high current density region (>1.0 A/cm2), it may be desirable for at least some applications to elevate the pressure difference between anode and cathode.

With continuing reference to FIG. 2, the method 100 proceeds to block 103 and monitors a system voltage of the fuel cell system. This system voltage may include an average cell voltage of a selected subset of fuel cells, a random sampling of fuel cells, or all of fuel cells in the fuel cell stack. In a specific example, monitoring system voltage includes calculating a moving average fuel cell voltage while operating at steady state conditions. This may include calculating a first voltage value V1 while the anode valve is in a closed state. In this regard, decision block 105 is an executable instruction for the ECU to detect if the anode valve has transitioned from the closed state to the opened state. If the anode valve has not opened (block 105=NO), the method 100 will loop back to block 103 and continue monitoring system voltage.

Responsive to a determination that the anode valve has transitioned to the opened state (block 105=YES), method 100 will store in temporary memory (or "latch") the first voltage value V1, as indicated at block 107, and then determine a second voltage value V2 while the anode valve is in an opened state and detect a voltage magnitude change ΔV, at block 109. By way of example, and not limitation, the voltage magnitude change ΔV can be determined by comparing the open valve operating fuel cell voltage V2 with the closed valve operating fuel cell voltage V1, and calculating a difference between the first and second voltage values: ΔV=V1−V2. At decision block 111, the ECU 82 will determine if the voltage magnitude change in the system voltage is larger than the calibrated/modeled voltage drop (Vdip) value. If the calculated voltage magnitude change is not greater than the calibrated voltage drop (block 111=NO), e.g., and the valve remains open, the method 100 will loop back to block 109 and continue monitoring system voltage, then determine a new open valve operating fuel cell voltage V2 to thereby detect a new voltage magnitude change, and then determine if this new voltage magnitude change is larger than Vdip value correlated to a designated fluid property change.

Responsive to a determination that the voltage magnitude change is greater than the calibrated/modelled voltage drop (block 111=YES), the method 100 proceeds to block 113 and outputs a signal indicating detection of a flow phase change. The signal output in response to the voltage magnitude change being greater than the calibrated/modelled voltage drop may also include an indication that the fuel cell system's 14 anode liquid water separator 60 is empty or near empty. It may be desirable, for at least some system architectures, that this output signal also include a respective command signal to close the monitored valve or valves, e.g., at block 115. In the representative example illustrated in FIG. 2, fuel cell system voltage response may also be used to diagnose a stuck or otherwise malfunctioning valve assembly. At decision block 117, the method 100 may determine whether or not to stop running the fuel cell stack 20. Responsive to a positive determination (block 117=YES), the ECU 82 may output a command signal at block 119 to deactivate or otherwise temporarily discontinue operation of the fuel cell stack 20 and/or any other component of the system 14. Conversely, in response to a determination to not stop running the fuel cell stack (block 117=NO), the method 100 will loop back to block 103 and ECU 82 will re-execute one or more of the programmable instructions set forth in block 105-119.

For at least some optional configurations, the method 100 may supplement the foregoing operating fuel cell voltage response based phase change detection with an estimated fluid flow based phase change detection. That is, the ECU 82 may be further programmed to compare gas flow rates during anode valve closed operating conditions and gas flow rates during anode valve open operating conditions. If the gas flow rate change is significant, a signal indicating detection of phase change is generated. By way of example, and not limitation, the ECU 82 may be further programmed to monitor a gas flow rate of the fuel cell fluid during a closed state of an anode valve and an open state of the anode valve. If a change in the monitored gas flow rate exceeds a calibrated flow change value, the system will respond by outputting a signal indicating detection of the flow phase change.

Figure 3:
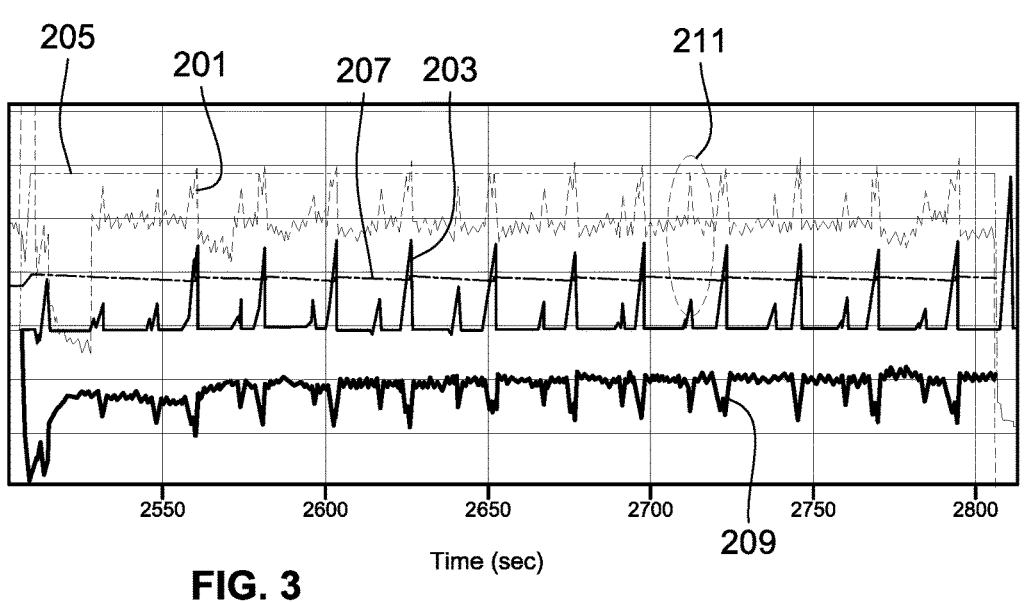
FIG. 3 is a graph illustrating a representative fuel cell procedure for characterizing fluid flow from the anode volume to the cathode volume using fuel cell stack average voltage in accord with aspects of the present disclosure.

FIG. 3 graphically illustrates a representative fuel cell phase detection procedure using fuel cell stack average voltage ("Vdip based phase detection protection"). In this example, Vdip-based phase detection is represented with a voltage magnitude change, designated 201 in FIG. 3, calculated from a moving average fuel cell voltage 209 and compared against tuned flow based phase detection, which is represented with a flow signal 203 in FIG. 3. Vdip value magnitude, which is designated 205 in FIG. 3, is set to approximately 0.005 V at a current density of approximately 1.0 A/cm$^2$. By comparison, the flow based phase threshold is shown at 207. According to the illustrated example, the Vdip-based procedure detects phased changes in instances where the flow-based procedure does not, as indicated at 211 between 2700 and 2750 seconds. In this instance, the bleed is completed and drain valve closed based on Vdip detection. Anode-to-cathode pressure bias can be changed, e.g., from a default value of 20 kPa to 40 kPa, to increase the expected Vdip value and, thus, help to improve phase detection due to Vdip. When phase is detected by either the Vdip procedure or the flow based procedure, valve flow may be determined to be non-zero with a single-phase flow and calculated hydrogen concentration may begin to increase; valve may be closed when calculated hydrogen concentration increases a calculated percentage (e.g., 3%) above H2 threshold. When phase change is detected by either the Vdip or flow based procedure, the drain sump may be considered empty; drain is completed and valve may be commanded closed.

Aspects of this disclosure may be implemented, in some embodiments, through a computer-executable program of instructions, such as program modules, generally referred to as software applications or application programs executed by an on-board vehicle computer. The software may include, in non-limiting examples, routines, programs, objects, components, and data structures that perform particular tasks or implement particular abstract data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, bubble memory, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by remote-processing devices that are linked through a communications network. In a distributed-computing environment, program modules may be located in both local and remote computer-storage media including memory storage devices. Aspects of the present disclosure may therefore, be implemented in connection with various hardware, software or a combination thereof, in a computer system or other processing system.

Any of the methods described herein may include machine readable instructions for execution by: (a) a processor, (b) a controller, and/or (c) any other suitable processing device. Any algorithm, software, or method disclosed herein may be embodied in software stored on a tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well-known manner (e.g., it may be implemented by an application specific integrated circuit (ASIC), a programmable logic device (PLD), a field programmable logic device (FPLD), discrete logic, etc.). Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

While aspects of the present disclosure have been described in detail with reference to the illustrated embodiments, those skilled in the art will recognize that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined in the appended claims. Moreover, the present concepts expressly include any and all combinations and subcombinations of the preceding elements and features.

What is claimed:

1. A method for operating a fuel cell system of a motor vehicle, the motor vehicle including a vehicle controller, a plurality of road wheels, and a traction motor operable to drive at least one of the road wheels, the method comprising:
    transmitting, via the vehicle controller, a command signal to the fuel cell system to generate electricity to power the traction motor and thereby drive at least one of the road wheels;
    determining, via the vehicle controller, a voltage-property correlation between voltage change of the fuel cell system and flow property change of a fluid in the fuel cell system;
    determining, from the voltage-property correlation, a calibrated voltage drop corresponding to the flow property change of the fluid;
    monitoring a system voltage of the fuel cell system;
    detecting a voltage magnitude change in the system voltage; and
    responsive to a determination that the voltage magnitude change is greater than the calibrated voltage drop, outputting a signal indicating detection of the flow property change, a signal to the fuel cell system to discontinue generating electricity, and/or a signal to close an anode valve operable to regulate transmission of anode exhaust gas from of the fuel cell system.

2. The method of claim 1, wherein determining the voltage-property correlation includes correlating voltage change of the fuel cell system and flow property change of the fluid when the anode valve is in a closed state and when the anode valve is in an open state.

3. The method of claim 1, wherein the fuel cell system includes a fuel cell stack with a cathode side, an anode side, and an electrolyte membrane between the cathode side and the anode side, and wherein determining the voltage-property correlation includes correlating voltage change of the fuel cell system and flow property change of the fluid during steady state operation of the fuel cell stack while the anode valve is open and with a pressure bias on the anode side.

4. The method of claim 3, wherein the pressure bias is approximately 20 to 100 KiloPascals (kPa) higher on the anode side than the cathode side.

5. The method of claim 1, wherein monitoring the system voltage includes determining a first voltage value while the anode valve is in a closed state and determining a second voltage value while the anode valve is in an opened state.

6. The method of claim 5, further comprising:
determining if the anode valve has transitioned from the closed state to the opened state; and
responsive to a determination that the anode valve has transitioned to the opened state, detecting the voltage magnitude change by calculating a difference between the first and second voltage values.

7. The method of claim 6, further comprising, responsive to a determination that the voltage magnitude change is not greater than the calibrated voltage drop, repeating the monitoring system voltage and detecting voltage magnitude change steps.

8. The method of claim 1, wherein the fuel cell system includes a fuel cell stack with a cathode side, an anode side, and an electrolyte membrane between the cathode side and the anode side, the anode valve receiving the anode exhaust gas from the anode side of the fuel cell stack, and wherein the signal output in response to the voltage magnitude change being greater than the calibrated voltage drop includes the signal to close the anode valve.

9. The method of claim 8, wherein the fuel cell system further includes a liquid water separator receiving anode exhaust gas from the anode valve, and wherein the signal output in response to the voltage magnitude change being greater than the calibrated voltage drop includes an indication that the liquid water separator is at or near empty.

10. The method of claim 1, further comprising:
monitoring a gas flow rate of the fluid during a closed state of the anode valve and an open state of the anode valve; and
responsive to a determination that a change in the monitored gas flow rate exceeds a calibrated flow change value, outputting the signal indicating detection of the flow property change.

11. The method of claim 1, wherein the calibrated voltage drop is between approximately 0.005 and 0.015 volts at a current density of between approximately 0.1 and 1.0 amperes per square centimeter and an anode-to-cathode pressure bias of between approximately 20 and 40 kPa.

12. The method of claim 1, wherein the system voltage includes a moving average voltage of the fuel cell system operating at steady state.

13. The method of claim 1, wherein the fluid includes hydrogen, and wherein the flow property change includes a liquid-to-gas, gas-to-liquid, gas-to-solid and/or solid-to-gas property change.

14. The method of claim 1, wherein the fuel cell system includes a fuel cell stack, and wherein the system voltage includes an average cell voltage of a plurality of fuel cells in the fuel cell stack.

15. A motor vehicle comprising:
a vehicle body with a plurality of road wheels;
a traction motor attached to the vehicle body and configured to drive one or more of the road wheels;
a fuel cell system operable to power the traction motor and including an anode exhaust valve, a liquid water separator, and a fuel cell stack with a cathode, an anode, and a proton exchange membrane disposed between the cathode and anode, the anode exhaust valve regulating transmission of exhaust gas from the anode to the liquid water separator; and
a vehicle controller attached to the vehicle body and programmed to:
transmit a command signal to the fuel cell system to generate electricity to power the traction motor and thereby drive one or more of the road wheels;
determine a voltage-property correlation between voltage change of the fuel cell system and flow property change of a hydrogen-based fluid in the fuel cell system;
determine, from the voltage-property correlation, a calibrated voltage drop corresponding to a flow property change of the fluid;
monitor a system voltage of the fuel cell system while the anode exhaust valve is in a closed state and an open state;
detect a voltage magnitude change in the system voltage when the anode exhaust valve transitions from the closed state to the open state;
determine if the voltage magnitude change is greater than the calibrated voltage drop; and
responsive to a determination that the voltage magnitude change is greater than the calibrated voltage drop, output a signal indicating detection of the flow property change and a command signal to close the anode exhaust valve.

16. A fuel cell system comprising:
a fuel cell stack with a cathode, an anode, and a proton exchange membrane disposed between the cathode and anode;
a liquid water separator fluidly connected to the fuel cell stack and operable to remove liquid water from exhaust gas exiting the anode;
an anode exhaust valve fluidly connected to the liquid water separator and operable to regulate transmission of the exhaust gas from the anode to the liquid water separator; and
an electronic control unit programmed to:
transmit a command signal to the fuel cell stack to generate electricity;
determine a voltage-property correlation between voltage change of the fuel cell system and flow property change of a fluid in the fuel cell system;
determine, from the voltage-property correlation, a calibrated voltage drop corresponding to the flow property change of the fluid;
monitor a system voltage of the fuel cell system;
detect a voltage magnitude change in the system voltage; and
responsive to a determination that the voltage magnitude change is greater than the calibrated voltage drop, output a command signal to the fuel cell stack to discontinue generating electricity and/or a command signal to close the anode exhaust valve.

17. The fuel cell system of claim 16, wherein determining the voltage-property correlation includes correlating voltage change of the fuel cell system and flow property change of the fluid when the anode exhaust valve is in a closed state and in an open state.

18. The fuel cell system of claim 16, wherein determining the voltage-property correlation includes correlating the voltage change of the fuel cell system and the flow property change of the fluid during steady state operation of the fuel cell stack with the anode exhaust valve in an open state and with a pressure bias on the anode.

19. The fuel cell system of claim 16, wherein monitoring the system voltage includes determining a first voltage value while the anode exhaust valve is in a closed state and determining a second voltage value while the anode exhaust valve is in an opened state.

20. The fuel cell system of claim 19, wherein the electronic control unit is further programmed to:
  determine if the anode exhaust valve has transitioned from the closed state to the opened state; and
  responsive to a determination that the anode exhaust valve has transitioned to the opened state, detect the voltage magnitude change by calculating a difference between the first and second voltage values.

* * * * *